United States Patent [19]

Lindquist et al.

[11] Patent Number: 5,380,504
[45] Date of Patent: Jan. 10, 1995

[54] TREATMENT OF GOLD BEARING ORE

[75] Inventors: William E. Lindquist, Schnecksville; Brian T. Field, Whitehall; Bernard T. McCormick, Bethlehem, all of Pa.

[73] Assignee: Fuller Company, Bethlehem, Pa.

[21] Appl. No.: 51,711

[22] Filed: Apr. 23, 1993

[51] Int. Cl.⁶ .................................. C22B 11/02
[52] U.S. Cl. .............................. 423/23; 423/29; 423/47
[58] Field of Search .................. 423/23, 47, 29

[56] References Cited

U.S. PATENT DOCUMENTS 4,626,279 12/1986 Bjornberg et al. ............ 423/23
5,123,956 6/1992 Fernandez et al. ............ 423/47

FOREIGN PATENT DOCUMENTS 2060878 8/1992 Canada ........................ 423/47

Primary Examiner—Melvyn J. Andrews
Attorney, Agent, or Firm—Daniel DeJoseph

[57] ABSTRACT

The present invention relates to a process for roasting gold containing ore in which a flash furnace means is provided, in particular a gas suspension furnace for roasting the ore. Hot gas and the gold containing ore to be roasted are supplied to the furnace means, wherein the hot gas roasts the ore within the furnace means at temperatures between about 500° C. and 700° C. while the ore is suspended in the hot gas, after which the roasted ore is discharged from the furnace means along with the hot gas. In the apparatus of the present the ore to be calcined may optionally be preheated, prior to the ore entering the furnace means, by suspending the fresh ore in hot gas.

17 Claims, 1 Drawing Sheet

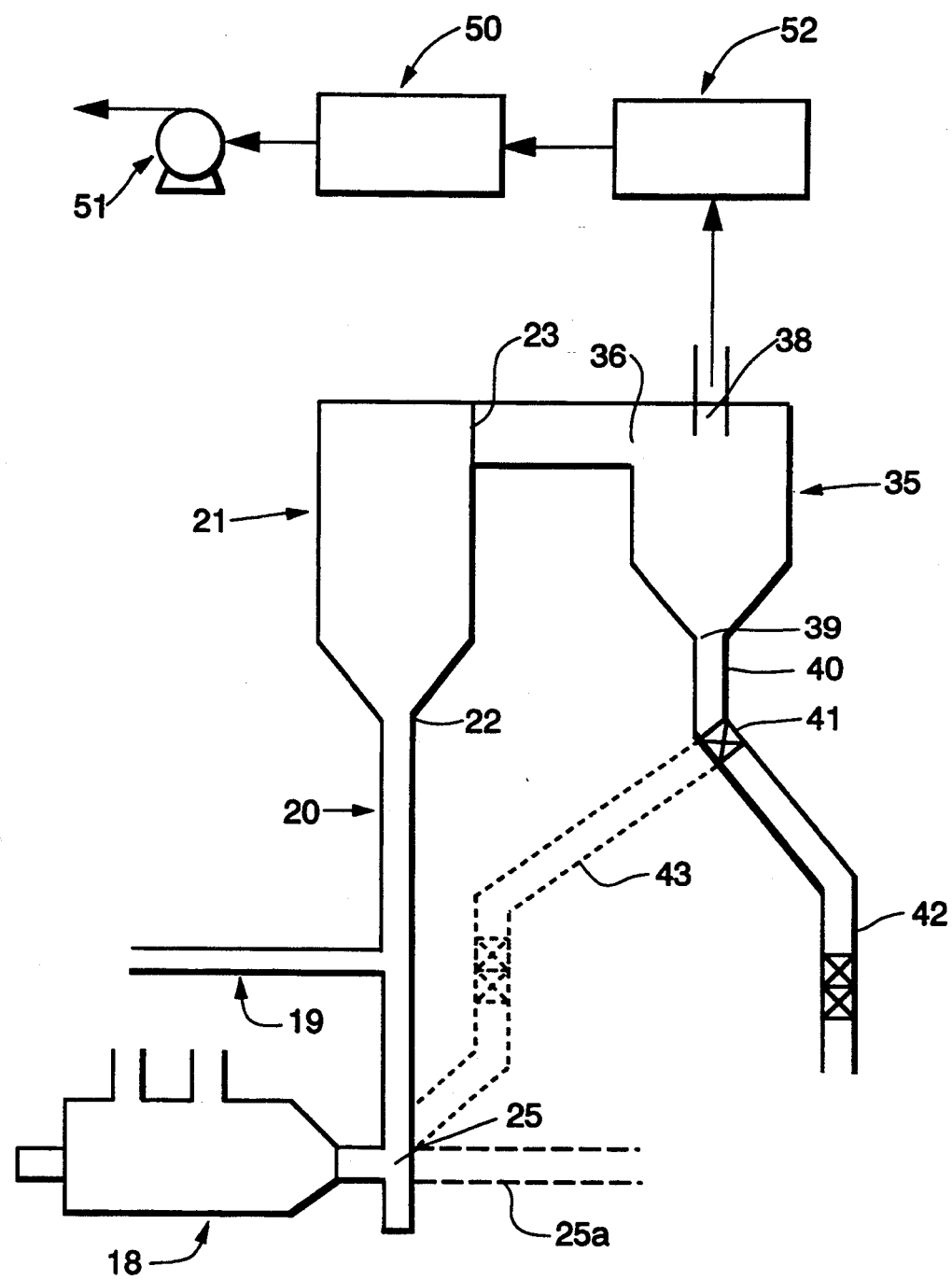

TREATMENT OF GOLD BEARING ORE

This invention relates to the recovery of precious metals from carbonaceous and sulfitic ores, from which ores said metals are not completely recoverable by standard cyanidation techniques. More specifically, the present invention relates to a process for the recovery of gold and in particular to a method for the recovery of gold from a refractory ore.

In the context of this disclosure, "refractory ore" is one which in its raw state will not readily allow precious metal extraction therefrom by direct cyanidation, nor, in some cases, by carbon-in-leach cyanidation (CIL) or carbon-in-pulp (CIP) cyanidation. Typically, such ores are sulfide and arsenide containing minerals in which a preponderant portion of gold and other cyanide leachable metals are locked up in sulfitic and arsenide crystal structures. The invention relates, more particularly, to an improved process for the treatment of these ores to obtain consistently high precious metal recoveries.

BACKGROUND OF THE INVENTION

A considerable effort has been devoted to recovery of increasingly greater amounts of precious metals from ores, and specifically refractory ores. Gold is found as the native metal widely distributed in minute traces in various minerals, such as certain quartz ores and certain alluvial gravels. The term "ore" as used in this specification includes an ore concentrate and other mineral bearing materials having elements or compounds which would be desirable to recover, but in which the gold is typically not recoverable by basic gravity concentration, or by simple cyanidation.

The method generally employed to extract gold from refractory ores consists of the roasting of sulphide concentrates obtained from crushed ores by flotation or other means of concentration. The roasting is followed by cyanidation.

Gold bearing ores are usually treated by a cyanide extraction process in which the ore is subjected to extraction with sodium cyanide. The cyanide solution then is contacted with a metal such as zinc to cause it to precipitate from solution.

It is generally believed that roasting either liberates the gold from the sulphide minerals or at least exposes the gold to cyanide solutions. In this way, fairly satisfactory results may be obtained from some refractory ores. However, it should be understood that the amount of gold that is recoverable from said refractory ores is very minute. Typically, one ton of a typical refractory ore may contain 80% $SiO_2$, about 10% of $CaCO_3$, approximately 5% of $FeS_2$ (Pyrite) about 1% C but only about 1 ounce of gold.

It is known that the intense roasting of many ores can cause the actual loss of so-called micron gold. The boiling point of gold is sufficiently high that roasting does not actually vaporize the gold; however, very small particles of gold can be lost as an aerosol. Unless an electrostatic precipitation apparatus is installed, and particulates are recovered with great care, as much as 75% of all gold in a particular type of ore can be lost. The economic recovery of gold from low grade ores requires improved processing methods. After sizing the ore, a preliminary oxidizing roast has proven effective in enhancing recovery of gold and reducing recovery costs by limiting cyanide losses. The purpose of the oxidizing roast is to burn the carbon and sulfur contained in the ore, and to oxidize the iron. Additionally, the roast should not destroy the porosity of the ore structure and hinder the access of the leach to the interstitial gold. Unburned carbon left in the processed ore can absorb cyanide in the CIL (Carbon In Leach) recovery processing following the roasting. The unburned carbon in the ore steals cyanide and gold away from the activated carbon added during the leaching step. It has been discovered that an incomplete roast of the ore, at low temperature, can leave gold in the particle core, while a high temperature roast can cause the formation of non-porous hematite. In the latter situation, the gold would become encapsulated, rendering it unobtainable by cyanidation.

The roasting of refractory gold-bearing ores is presently accomplished using rotary kilns and fluid bed reactors. The rotary kiln has disadvantages associated with poor mixing of the process gas with the ore; which limits the oxidation, and temperature control. The fluid bed has the advantages of excellent mixing of ore and oxidizing gas, and good temperature control. The disadvantages of the fluid bed process include high power costs, low gas velocities; and the high cost of injecting pure oxygen. In both methods, the residence time of gold while in the roasting stage is somewhat lengthy, for example, within the fluid bed reactor the time needed is approximately 20 minutes. Obviously, if the time for roasting the gold bearing ores could be appreciably reduced much more material can be processed over a given period of time. In view of the very small amounts of gold extracted from a given amount of material it would be desirable to process the material as quickly as possible.

The invention described here is a novel way of roasting gold ore with advantages over existing processing methods. The invention utilizes a flash furnace system, which offers the unique advantages of very short retention times, high heat transfer rates, excellent oxygen contact with individual particles, and rapid cooling. The primary variables considered in gold ore roasting are temperature, mixing and oxygen contact, and retention time. The flash furnace is a gas suspension processing device, and therefore the solids are mixed thoroughly with the gas stream and carried by the gas stream. As a result of the mixing, oxygen contact and heat transfer are excellent. The short retention time allows burn-off of carbon without the collapse of pore structure sometimes associated with other pyroprocessing methods. This not only enhances carbon removal, but also enhances cyanide contact and removal of the gold ore, and also, of course, increases the amount of ore that can be processed during a given period of time over prior art roasting procedures. In a further embodiment of the invention, the retention time can be increased if necessary by recirculating a portion of the collected product back to the flash furnace. This requires little additional heat to accomplish, since the hot material is recirculated directly from the hot collection cyclone.

DESCRIPTION OF THE DRAWINGS

The FIGURE is a diagrammatic view of the apparatus of the present invention for carrying out the process of the present invention.

DESCRIPTION OF THE PREFERRED EMBODIMENT

The apparatus for carrying out the process of the present invention comprises a gas suspension flash furnace which is typically in the form of an upright cylinder. The unit may be conventional, with the notable exception that typically the unit does not contain any burners or fuel inlets. The flash furnace includes a vessel and an inlet for preheated gas and an inlet for the partially preheated gold bearing ore.

As the raw material travels upward through the furnace unit there is rapid or "flash" oxidation of the raw material.

The spent combustion gas and the roasted gold ore are discharged from the vessel and conveyed by conduit to a cyclone, wherein separation takes place.

The apparatus of the present invention is depicted in the embodiments set forth the FIGURE, which is not drawn to scale.

In order to be suitable for use in the apparatus and process of the present invention, the gold bearing ore should typically have a top size that is less than about 20 mesh and preferably should have a top size that is less than about 40 mesh. It is understood by the skilled practitioner that the phrase "have a top size" and the like when used herein does not meant that none of the particles being treated are larger than the size stated. Rather, the phrase when used herein means that the vast majority of particles being roasted are less than the stated size. In view of the above, the gold bearing ore is typically first introduced into a raw material preparation system which may include a crusher means, such as a hammer mill, in which large pieces of gold bearing material as mined are broken down into smaller pieces. The material may then be supplied through a suitable conveying system to a grinding mill which may either be a ball mill or a roller mill. All of this equipment is generally known in the art and need not be described in detail. The material may then be supplied through a conveying line to a storage bin. The bin may include a valve for metering flow out of the bin. Alternatively, the crushed material may be fed to a separator means, such as an O-Sepa separator, with the larger reject material optionally being recycled for further crushing.

The product that is to be treated according to the process of the present invention is thereafter supplied via a suitable conveying system to the flash furnace, and optionally first to a preheater portion of the apparatus, which essentially consists of conduit or duct which leads to a flash furnace means, either directly or through intermediate cyclone separators. In the depicted embodiment, the material to be roasted is supplied through a conduit 19 to duct 20 so that fresh material is entrained in the stream of hot preheating oxygen containing gas penetrating from heater 18, which may be an air heater. Heater 18 is typically of a type generally known in the art and may be supplied with air for combustion and optionally fuel from one or more suitable sources (not shown). The material will have a very brief residence period in duct 20 before it travels to furnace means 21. The material then enters furnace means 21 through inlet 22, which in the depicted embodiment is also an inlet for the hot gas flow into furnace means 21. Optionally, there may be separate inlets for the gas and the material. The preheated gas will enter conduit 20 from heater 18 through inlet 25. In an optional embodiment of this invention, the gold-containing material to be roasted may enter conduit 20 in the general vicinity of inlet 25, such as via conduit 25a, shown in broken lines in FIG. 1. In another optional embodiment, the material may directly enter furnace means 21, such as via conduit 26, also shown in broken lines in the FIGURE.

Furnace means 21 contains an upper outlet 23 for hot gas and entrained roasted material. Again, optionally furnace means 21 can contain different outlets for the gas and the material. Outlet 23 is close coupled to a gas-solid separator 35 of the cyclone type which typically includes a tangential inlet 36 flow connected to an outlet 38 for dirty hot spent gas and an outlet 39 for separated roasted ore. The roasted ore is discharged from cyclone 35 into duct 40 and subsequently discharged as product, typically in the form of pellets. The calcined pellets are then ground and, typically, are exposed to an aqueous cyanide solution. Optionally, the product may be discharged from duct 40, which, via diverter valve 41, is divided between two ducts, duct 42, from which the material will flow to product, by typically first passing through a cooler means (not shown) and duct 43 (shown in broken lines), through which some of the material may be directed for eventual recirculation through furnace means 21.

The high efficiency dust collector system that may be used in the present invention includes the high efficiency dust collector 50 or bag house with an outlet fan 51 connected to a stack (not shown). Optionally, heat exchanger 52 may be located intermediate dust collector 50 and cyclone 35. In an optional embodiment that is not depicted, there may be provided an outlet which supplies collected dust to a conveyor means, such as a conveyor belt and conduit for eventual recirculation to the flash furnace system.

As indicated, in the roasting operation fresh material to be roasted is first passed through a mineral processing stage in which it undergoes a size reduction. Typically, the material will pass through a screen means so that material as fine as 20 mesh or less, and more preferably, as fine as 40 mesh or less, will be utilized in the apparatus and method of the present invention. Such material, being at ambient temperature, will be provided by feed means to the conduit that leads to the flash furnace for preheating. Alternatively, depending on factors such as the fineness of the material, the ore may be supplied directly to the flash calciner. In a further embodiment the material may be preheated in a different section from where the hot gas enters the system. In such a system the material and air would typically flow counter-current to each other, with the raw ore entering the unit at one end and being heated by air that traveled from the flash furnace, with the process air entering the system from the opposite end.

As depicted, in conduit 20 the raw material is entrained in the flow of hot gas. While the material is entrained in the hot gas, it is preheated by the hot gas and at least partially dried, with free material being released. The preheated and at least partially dried ore is then supplied to furnace means 21 where it is roasted.

It is a feature of the present invention that the material is maintained in the furnace vessel at temperatures generally much less than usually employed in flash furnaces for other material processing. Typically, the material is maintained at a temperature in the range of 500° C. to 750° C., and preferably in the range of about 650° C. to about 700° C.

The hot gas from the vessel is discharged along with the entrained roasted gold-containing ore through the conduit to the close coupled cyclone wherein the hot gas is separated from the particulate material and supplied to the dust collection system.

With the present invention, the resident time of the roasted ore in the furnace, that is, the time the ore is in the furnace during a single pass through the furnace, is in the range of about 2 to about 6 seconds, and most preferably in the range of from about 2 to about 4 seconds. As indicated, this invention contemplates the optional feature of recirculating the ore back through the furnace means. In this regard, the total resident time the ore can be in the furnace means, taking such optional recirculation into consideration, is generally in the range of about 2 to about 20 seconds, and most preferably in the range of from about 5 to about 15 seconds. Obviously, longer resident times can be utilized if necessary. The total resident time of the ore in the entire system of the present invention, from entry through the separation step, will generally be approximately one minute, although that amount of time may vary. It will be appreciated the amount of time needed to adequately complete the roasting process will be dependent in part on the size of material, the temperature the material is exposed to within the flash furnace, the amount of oxygen within the gas stream, and other variables. However, in general it is an unexpected feature of the present invention that sufficient roasting can usually be achieved by a single pass through the flash furnace at very short resident times.

It is intended that the foregoing be a description of the preferred embodiment and that the invention be limited solely by that which is in the scope of the appended claims.

We claim:

1. A process for roasting gold containing ore comprising the steps of:
    providing a flash furnace means for roasting gold containing ore at a temperature in the range of from about 500° C. to about 750° C.;
    introducing hot oxygen containing gas and gold containing ore to be roasted to the furnace means whereby the hot gas roasts the gold ore within the furnace means while the gold ore is suspended in the hot gas;
    discharging the roasted ore and the hot gas from the furnace means with said ore being retained in said furnace means for approximately from about 2 to about 20 seconds;
    separating the roasted ore from the discharged hot gas.

2. The process according to claim 1 wherein the gold containing ore is preheated prior to being introduced into the furnace means.

3. The process according to claim 1 wherein the temperature is in range of from about 650° C. to about 700° C.

4. The process according to claim 1 wherein a portion of the separated roasted ore is recirculated back to the furnace means for further roasting.

5. A process for roasting gold containing ore comprising the steps of:
    providing a flash furnace means for roasting gold containing ore at a temperature in the range of from about 500° C. to about 750° C.;
    introducing hot oxygen containing gas and gold containing ore to be roasted to the furnace means whereby the hot gas roasts the gold ore Within the furnace means while the gold ore is suspended in the hot gas;
    discharging the roasted ore and the hot gas from the furnace means, with said ore being retained in said furnace means for approximately from about 2 to about 20 seconds; and
    separating the roasted ore from the discharged hot gas,
    wherein the flash furnace means includes a stationary vessel having a lower inlet for hot gas and entrained gold containing ore to be roasted and an upper outlet for hot gas and roasted ore and a gas-solids separator close coupled to the outlet of the stationary furnace for separating the roasted gold-containing ore from the hot gas.

6. A process for roasting gold containing ore according to claim 1 wherein the gold containing ore to be roasted has a particle size of smaller than approximately 20 mesh.

7. A process for roasting gold containing ore according to claim 6 wherein the gold containing ore to be roasted has a particle size of smaller than approximately 40 mesh.

8. A process for roasting gold containing ore according to claim 3 wherein the gold containing ore to be roasted has a particle size of less than approximately 20 mesh.

9. A process for roasting gold containing ore according to claim 1 wherein the ore to be roasted is retained in said furnace means for approximately from about 2 to about 6 seconds.

10. A process for roasting gold containing ore according to claim 9 wherein the ore to be roasted is retained in said furnace means for approximately from about 2 to about 4 seconds.

11. The process according to claim 1 wherein the separated gas thereafter is directed through a dust collector means.

12. The process according to claim 11 wherein any dust collected in said dust collector means is recirculated to the flash furnace means for further roasting.

13. A process for roasting gold containing ore comprising the steps of:
    providing a flash furnace means for roasting gold containing ore at a temperature in the range of from about 650° C. to about 700° C.;
    introducing hot oxygen containing gas and gold containing ore to be roasted having a particle size of smaller than approximately 20 mesh to the furnace means whereby the hot gas roasts the gold ore within the furnace means while the gold ore is suspended in the hot gas;
    discharging the roasted ore and the hot gas from the furnace means, with said ore being retained in said furnace means for approximately from about 2 to about 6 seconds;
    separating the roasted ore from the discharged hot gas.

14. A process for roasting gold containing ore according to claim 13 wherein the gold containing ore to be roasted has a particle size of smaller than approximately 40 mesh.

15. A process for roasting gold containing ore according to claim 13 wherein the ore to be roasted is retained in said furnace means for approximately from about 2 to about 4 seconds.

16. The process according to claim 13 wherein the separated gas thereafter is directed through a dust collector means.

17. The process according to claim 16 wherein any dust collected in said dust collector means is recirculated to the flash furnace means for further roasting.

* * * * *